US010960621B2

(12) United States Patent
Greydanus et al.

(10) Patent No.: US 10,960,621 B2
(45) Date of Patent: Mar. 30, 2021

(54) METHOD AND DEVICE FOR MAKING A DOUBLE-TOOTHED BELT

(71) Applicant: ContiTech Antriebssysteme GmbH, Hannover (DE)

(72) Inventors: Ymte Greydanus, Barsinghausen (DE); Friedemann Schiffer, Wennigsen (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 446 days.

(21) Appl. No.: 15/967,215

(22) Filed: Apr. 30, 2018

(65) Prior Publication Data

US 2018/0244006 A1 Aug. 30, 2018

Related U.S. Application Data

(63) Continuation of application No. PCT/EP2016/067608, filed on Jul. 25, 2016.

(30) Foreign Application Priority Data

Oct. 29, 2015 (DE) .......................... 102015221168.1

(51) Int. Cl.
*B29D 29/08* (2006.01)
*B29C 35/02* (2006.01)
(Continued)

(52) U.S. Cl.
CPC ........ *B29D 29/085* (2013.01); *B29C 35/0227* (2013.01); *B29C 43/021* (2013.01);
(Continued)

(58) Field of Classification Search
CPC ............ B29D 29/085; B29C 2043/028; B29C 35/0233
See application file for complete search history.

(56) References Cited

U.S. PATENT DOCUMENTS 2,583,085 A * 1/1952 Campbell ........... B29C 35/0227
425/34.2
3,078,206 A * 2/1963 Skura ..................... B29D 29/08
156/140
(Continued)

FOREIGN PATENT DOCUMENTS

EP 1279482 A2 1/2003

OTHER PUBLICATIONS

International Search Report dated Nov. 7, 2016 of international application PCT/EP2016/067608 on which this application is based.

*Primary Examiner* — Jacob T Minskey
*Assistant Examiner* — Virak Nguon
(74) *Attorney, Agent, or Firm* — David L. Cate; Gregory Adams (57) ABSTRACT

A device for making a double-sided toothed belt has an inner mold having teeth and an outer mold. The outer mold includes segments arranged parallel to the longitudinal axis of the inner mold and mutually adjacent. The device has a force transmission element arranged on the radial outer side of the segments. A pressure vessel has a cylindrical wall surrounding the force transmission element. The force transmission element is formed as a bellows fastened with two ends in pressure-tight fashion to the pressure vessel. The force transmission element is arranged in a ring-shaped space formed between the wall of the pressure vessel and the radial outer side of the segments. The pressure vessel has a pressure medium bore which opens into the ring-shaped space radially outside the force transmission element. The segments and the inner mold each have one axial passage bore through which fluid can be conducted.

10 Claims, 4 Drawing Sheets

(51) Int. Cl.
*B29C 43/02* (2006.01)
*B30B 11/00* (2006.01)
*B29C 43/36* (2006.01)

(52) U.S. Cl.
CPC .......... *B29C 43/027* (2013.01); *B30B 11/007* (2013.01); *B29C 2043/028* (2013.01); *B29C 2043/3618* (2013.01)

(56) References Cited

U.S. PATENT DOCUMENTS

| | | | | |
|---|---|---|---|---|
| 3,784,338 | A * | 1/1974 | Previati | B29D 29/00 |
| | | | | 425/34.2 |
| 3,934,968 | A * | 1/1976 | Cicognani | B29C 43/027 |
| | | | | 425/28.1 |
| 4,379,011 | A * | 4/1983 | Henderson | B29C 43/102 |
| | | | | 156/140 |
| 4,984,976 | A * | 1/1991 | Kozachevsky | B29C 33/22 |
| | | | | 264/296 |
| 6,177,042 | B1 | 1/2001 | Fike | |
| 2003/0168777 | A1* | 9/2003 | Fujita | B29C 43/222 |
| | | | | 264/326 |

\* cited by examiner

METHOD AND DEVICE FOR MAKING A
DOUBLE-TOOTHED BELT

CROSS REFERENCE TO RELATED APPLICATIONS

This application is a continuation application of international patent application PCT/EP2016/067608, filed Jul. 25, 2016 designating the United States and claiming priority from German application 10 2015 221 168.1, filed Oct. 29, 2015, and the entire content of both applications is incorporated herein by reference.

FIELD OF THE INVENTION

The invention relates to method and a manufacturing device for producing a double-sided toothed belt, wherein the manufacturing device has a hollow cylindrical inner mold, which is closed off via a base and a cover and which, on its radial outer side, has teeth oriented parallel to the longitudinal axis of the inner mold, which teeth are in each case spaced apart from one another by a tooth space. Furthermore, said machine has an outer mold, which is arranged with a radial spacing to the inner mold and which is composed of a multiplicity of mold segments which are arranged parallel to the longitudinal axis of the inner mold and adjacent to one another in a circumferential direction of the inner mold and which, at their side pointing toward the inner mold, have in each case at least one tooth and at least one section of a tooth space and/or at least one complete tooth space. Furthermore, in the case of said manufacturing device, a flexible and hollow cylindrical force transmission element is arranged on the radial outer side of the mold segments, which force transmission element is surrounded radially at the outside by the hollow cylindrical wall of a pressure vessel. Finally, said manufacturing device has guide elements which are fastened or formed in each case on the two axial ends of the respective mold segments and which are arranged in radially movable fashion in respectively associated guides.

BACKGROUND OF THE INVENTION

A manufacturing device of said type for producing a toothed belt which has teeth on its radially outer side and on its radially inner side is known from U.S. Pat. No. 3,934,968. In comparison with the production method and production devices mentioned in the introduction in U.S. Pat. No. 3,934,968, the invention in said document evidently exhibits certain improvements. The applicant's new invention described below is intended to further develop the manufacturing device as per U.S. Pat. No. 3,934,968.

To make the advantages of the present invention clearly evident, the known manufacturing device and the production method that can be carried out therewith will firstly be discussed in detail. According to this document, to manufacture a double-sided toothed belt of the stated type, a material is firstly laid onto the teeth and tooth spaces of the inner mold. A cord is wound onto said material, and an elastomer material is then laid in multiple layers onto the windings of the cord, wherein the volume of the looped elastomer is sufficient to form the complete toothed belt together with its teeth. A material is then laid onto the elastomer. Finally, a segmented outer mold is formed by arranging a multiplicity of rod-shaped mold segments which are laid onto the upper material layer of said loop. On the axial ends of the mold segments there are formed axially protruding pegs which engage into respectively associated, radially extending recesses, which are radially open at one side and which are formed on ring-shaped flanges on the two face sides of the inner mold. After the outer mold has been assembled in this way, a deformable, hollow cylindrical shell is pulled over the mold segments of the outer mold. The mold thus assembled is subsequently arranged in an autoclave, into which vapor is then introduced at positive pressure, such that said vapor acts with a pressing force on the deformable shell from radially outside. Hot vapor is also introduced from the outside into the cylindrical cavity of the inner mold. Under the action of the pressure of the hot vapor acting radially on the outside of the shell, a radially inwardly pointing force acts on the mold segments, which force drives said mold segments radially inward until they make contact with the windings of the cord. In this way, the elastomer of the loop is, after being plasticised, pressed into all of the spaces of the mold, such that the teeth and tooth spaces of the toothed belt which is toothed on both sides are formed. The loop is subsequently vulcanized by the heat of the vapor that has flowed into the mold. Finally, the mold is removed from the autoclave and, after a short cooling time has elapsed, the deformable shell is pulled away from the mold segments. The mold segments, which are now free from radial load, are then removed from the loop, and the fully vulcanized loop can then be removed from the inner mold. Said fully vulcanized loop, which has teeth on both sides, is finally cut and separated into individual double-sided toothed belts each of a predetermined width.

Even though the described mold permits the production of generic double-sided toothed belts in an extremely progressive manner, certain severe disadvantages are nevertheless evident, because the assembly of the mold is labor-intensive, and the cycle time required for producing a fully vulcanized tooth-belt loop is relatively long. Aside from the assembly and disassembly effort mentioned, this also lies in the fact that the known mold must in each case be arranged in an autoclave and subjected to vapor pressure therein. Also, the cooling of the mold after the vulcanizing process in the autoclave to a temperature that places a low burden on persons takes a relatively long time.

SUMMARY OF THE INVENTION

It is an object of the invention to improve the mold known from U.S. Pat. No. 3,934,968, and the production method described therein, such that shorter cycle times and thus lower production costs are possible.

This object can, for example, be achieved via a manufacturing device for making a double-sided toothed belt. The manufacturing device includes: a hollow cylindrical inner mold defining a longitudinal axis and being closed off via a base and a cover; the hollow cylindrical inner mold having a radial outer side and teeth on the radial outer side; the teeth being oriented parallel to the longitudinal axis of the inner mold; the teeth each being spaced apart from one another by a tooth space; an outer mold arranged with a radial spacing to the inner mold; the outer mold including a multiplicity of mold segments arranged parallel to the longitudinal axis of the inner mold and adjacent to one another in a circumferential direction of the inner mold; the mold segments each having a side facing the inner mold; the mold segments each having at least one tooth on the side facing the inner mold; the mold segments each defining at least one section of a tooth space and/or at least one complete tooth space; the mold segments defining a radial outer mold segment side; a flexible and hollow cylindrical force transmission element arranged on the radial outer mold segment side; a hollow cylindrical pressure vessel having a hollow cylindrical wall which surrounds the force transmission element radially at the outside; each of the mold segments having two axial ends; a plurality of guide elements which are fastened or formed in each case on the two axial ends of the respective mold segments and which are arranged in radially movable fashion in respectively associated guides; the force transmission element being formed as a bellows which is fastened with its two axial ends in pressure-tight fashion to the pressure vessel; the force transmission element being arranged in a ring-shaped space which is formed between the hollow cylindrical wall of the pressure vessel and the radial outer side of the mold segments; the pressure vessel having at least one pressure medium bore which opens into the ring-shaped space radially outside the force transmission element; the mold segments each having one axially oriented passage bore through which a heating fluid and a cooling fluid can be conducted; and, the hollow cylindrical inner mold being configured such that a heating fluid and a cooling fluid can be conducted therethrough.

The object can, for example, further be achieved via a method for making a double-sided toothed belt, which is equipped with teeth on both sides, in a manufacturing device in which a loop made of an elastomer and a textile inlay is arranged radially between a cylindrical inner mold and a cylindrical outer mold in a deformation space, wherein the inner mold, on its radial outer side, has teeth oriented parallel to the longitudinal axis of the inner mold, which teeth are in each case spaced apart from one another by a tooth space, wherein the outer mold includes a multiplicity of mold segments which are arranged parallel to the longitudinal axis of the inner mold and adjacent to one another in a circumferential direction of the inner mold and which, at their side pointing toward the inner mold, have in each case at least one tooth and at least one section of a tooth space and/or at least one complete tooth space, wherein the mold segments are surrounded radially at the outside by a flexible and hollow cylindrical force transmission element which is surrounded by the cylindrical wall of a pressure vessel, and in which method the force transmission element is fastened with its axial ends in the pressure vessel so as to be sealed off radially to the inside. The method includes the steps of: conducting a heating fluid through the mold segments of the outer mold and through the inner mold, the temperature of the heating fluid being sufficient to plasticize the elastomer of the loop; for the deformation of the loop that has not yet been vulcanized, injecting a fluid at a positive pressure into a ring-shaped space between the cylindrical wall of the pressure vessel and the force transmission element, as a result of which the force transmission element bears with a pressing force against the outer side of the mold segments of the outer mold and material of the loop is forced into the tooth spaces of the inner mold and of the outer mold; conducting a heating fluid through the inner mold and through the mold segments of the outer mold, the temperature of the heating fluid being sufficient to vulcanize the elastomer of the loop; after the vulcanization of the loop, introducing a cooling fluid through the inner mold and through the mold segments of the outer mold; connecting the ring-shaped space between the cylindrical wall of the pressure vessel and the force transmission element to ambient pressure or to a negative pressure; removing the deformed and vulcanized loop from the manufacturing device; and, cutting the deformed and vulcanized loop into individual double-sided toothed belts of predetermined width.

The invention is based on the realization that the cycle time in the production of double-sided toothed belts can be reduced if the manufacturing device can act as a mold and simultaneously as an autoclave, and if the manufacturing device is configured such that its shape-imparting components are configured to be actively coolable. In this way, it is firstly the case that the transfer of the mold into and out of an autoclave is eliminated, and secondly, the cooling time is greatly reduced, such that the fully vulcanized toothed-belt loop can be very quickly removed from the manufacturing device and said manufacturing device can be fed with a loop for the next plasticization, molding and vulcanization process.

Accordingly, an aspect of the invention is based on a manufacturing device for producing a double-sided toothed belt, having     a hollow cylindrical inner mold, which is closed off via a base and a cover and which, on its radial outer side, has teeth oriented parallel to the longitudinal axis of the inner mold, which teeth are in each case spaced apart from one another by a tooth space,     an outer mold, which is arranged with a radial spacing to the inner mold and which is composed of a multiplicity of mold segments which are arranged parallel to the longitudinal axis of the inner mold and adjacent to one another in a circumferential direction of the inner mold and which, at their side pointing toward the inner mold, have in each case at least one tooth and at least one section of a tooth space and/or at least one complete tooth space,     a flexible and hollow cylindrical force transmission element, which is arranged on the radial outer side of the mold segments,     a hollow cylindrical pressure vessel, the hollow cylindrical wall of which surrounds the force transmission element radially at the outside,     and guide elements which are fastened or formed in each case on the two axial ends of the respective mold segments and which are arranged in radially movable fashion in respectively associated, radially oriented guides.

To achieve the stated object, it is furthermore provided in the case of said manufacturing device that the force transmission element is formed as a bellows which is fastened with its two axial ends in pressure-tight fashion to the pressure vessel, that the force transmission element is arranged in a ring-shaped space which is formed between the hollow cylindrical wall of the pressure vessel and the radial outer side of the mold segments, that the pressure vessel has at least one pressure medium bore which opens into the ring-shaped space radially outside the force transmission element, that the mold segments have in each case one axially oriented passage bore through which a heating fluid and a cooling fluid can be conducted, and that a heating fluid and a cooling fluid can be conducted through the hollow cylindrical inner mold.

The construction of said manufacturing device is highly advantageous because toothed-belt loops with teeth formed on both sides can be produced in very short time intervals using said manufacturing device. This is possible because the mold segments can be actively heated and cooled, because each manufacturing device is assigned a dedicated pressure vessel, and because said pressure vessel is thermally separated from the mold segments of the outer mold by the flexible force transmission element in the form of a bellows.

The force transmission element in the form of a bellows is preferably composed of a rubber matrix based on butyl, ethylene propylene diene rubber (EPDM) or similar material, which can be connected to fibers to form a composite material.

The fluid to be fed into the ring-shaped space between the force transmission element and the cylindrical wall of the pressure vessel is preferably compressed air, though may also be water or water vapor.

The conducting of fluid through the mold segments of the outer mold makes it possible, after a textile-reinforced loop has been fed to the mold, for said loop to be quickly heated, specifically firstly to the plasticization temperature and then subsequently to the vulcanization temperature of the elastomer, and subsequently permits active cooling of the mold segments. By virtue of the fact that each manufacturing device is assigned a dedicated pressure vessel, a transfer of the shape-imparting components of the manufacturing device into a separate autoclave is no longer necessary, which likewise saves production time. Finally, the thermal separation of the pressure vessel from the mold segments of the outer mold, from the loop and from the inner mold has the effect that the pressure vessel warms up only to a very small extent during operation, and work on the manufacturing device can be performed without risk and more quickly. If compressed air as pressurized fluid is fed into the ring-shaped space between the cylindrical wall of the pressure vessel and the flexible force transmission element of the manufacturing device, the wall of the pressure vessel can be kept approximately at ambient temperature.

To realize uniform heating of the textile-reinforced loop for the plasticization and vulcanization of the elastomer, it is provided in an embodiment of the invention that the inner mold can be filled with a heating fluid via at least one bore in the base or cover of said inner mold. Instead of the heating fluid, it is also possible for a cooling fluid to be conducted into the inner mold through said bore in order to be able, after the abovementioned vulcanization process, to cool said inner mold as quickly as possible for the impending removal of the vulcanized loop. It is for example possible for water vapor to be used as heating fluid and for water to be used as cooling fluid.

In another embodiment, it is preferably provided that the inner mold is formed so as to be removable from the pressure vessel and from the outer mold when the cover of said pressure vessel is open. In this way, it is possible for a textile-reinforced, non-vulcanized elastomer loop to be built up on the inner mold outside the pressure vessel, and for said elastomer loop to then subsequently be inserted together with the inner mold into the pressure vessel. This permits particularly short cycle times for the production of the loop which is toothed on both sides because, while the vulcanized loop cools on a first inner mold that has been lifted out of the manufacturing device, or while the pre-vulcanized loop fully vulcanizes and then cools, a second inner mold with a non-deformed and not yet vulcanized second loop arranged thereon is introduced into the manufacturing device, and the latter is closed for the deformation and vulcanization process that then follows.

The manufacturing device may also be configured such that a textile-reinforced, non-vulcanized elastomer loop is built up elsewhere and is subsequently positioned between the inner mold and the mold segments of the outer mold for the subsequent plasticization, deformation and vulcanization.

In the variant in which the inner mold is configured so as to be easily removable from the manufacturing device, it may be provided in another embodiment that the base, the cover and the interior space of the inner mold are extended through in pressure-tight fashion by a mandrel which, below the base, engages with one axial end thereof into a centering recess of the pressure vessel or of an overall device, and which, at its other axial end, has an eyelet for the engagement of a lifting tool. In this configuration, the inner mold is accordingly radially centered via the mandrel, in the pressure vessel or on an overall device that also bears the pressure vessel, in relation to the pressure vessel and the mold segments, arranged therein, of the outer mold, such that a double-sided toothed belt with the desired radial dimensions can be produced in an exact manner.

With regard to the mold segments of the outer mold, it is provided in another embodiment that these can be moved radially against the inner mold and moved away from the latter via an actuating device. In this way, the ring-shaped space between the radial inner side of the mold segments of the outer mold and the radial outer side of the inner mold can be set to be radially relatively wide via the positioning of the mold segments, such that the introduction of the inner mold with the loop arranged thereon, or of only the loop, can be performed in a very convenient manner. As soon as the loop is arranged inside ring-shaped space, the mold segments of the outer mold can be pushed radially against the loop via the stated actuating device, such that subsequently only a very slight radial movement of the mold segments in the millimeter range has to be effected via the flexible force transmission element. The radially inwardly or radially outwardly directed radial movement of the mold segments may be performed or at least assisted via the spring force of at least one spring.

In order that the pressure vessel can be of relatively small construction and in order to prevent undesired heating of the pressure vessel, it is preferably provided in another embodiment that the actuating device is arranged outside the pressure vessel and is connected to guide elements of the mold segments. Said guide elements are composed of a material with a low thermal conductivity, or are composed of a metal and surrounded by such a material, or the guide elements are mechanically connected to the actuating device via in each case one component with low thermal conductivity. It is thereby achieved that no heat or only very little heat can pass from the heated mold segments via the guide elements into the wall of the pressure vessel and to the actuating device.

With regard to the guide elements, it may be provided that these are arranged or formed on the axial face sides of the mold segments, and in that said guide elements interact with at least one positioning ring of the actuating device, in the event of the rotation of which positioning ring the mold segments are moved radially. The guide elements may also be formed as stud bolts which are fastened to the two axial face sides of the respective mold segments. The positioning ring may for example have, for each of the guide elements, a spiral-shaped guide groove into which the associated guide elements engage. The positioning ring may be rotated by electric motor, pneumatically or by hand.

In one variant, for this purpose, it is provided that radially oriented guide elements are connected to the respective mold segments, and that said guide elements are movable radially by a common actuating device. Said guide elements are guided radially and in a sealed manner through the wall of the pressure vessel, and the common actuating device is situated radially outside the pressure vessel. In this embodiment, the manufacturing device is axially particularly short.

The number of mold segments of the outer mold and the associated outlay for the actuating device thereof must be optimized. It is thus possible for a manufacturing device configured according to the invention to have only two or three mold segments of the outer mold.

A method is proposed for producing a double-sided toothed belt, which is equipped with teeth on both sides, in a manufacturing device in which a loop including an elastomer and a textile inlay is arranged radially between a cylindrical inner mold and a cylindrical outer mold in a deformation space, wherein the inner mold, on its radial outer side, has teeth oriented parallel to the longitudinal axis of the inner mold, which teeth are in each case spaced apart from one another by a tooth space, wherein the outer mold is composed of a multiplicity of mold segments which are arranged parallel to the longitudinal axis of the inner mold and adjacent to one another in a circumferential direction of the inner mold and which, at their side pointing toward the inner mold, have in each case at least one tooth and at least one section of a tooth space and/or at least one complete tooth space, wherein the mold segments are surrounded radially at the outside by a flexible and hollow cylindrical force transmission element which is surrounded by the cylindrical wall of a pressure vessel, and in which method the force transmission element is fastened with its axial ends in the pressure vessel so as to be sealed off radially to the inside. It is provided according to the method that a heating fluid is conducted through the mold segments of the outer mold and through the inner mold, the temperature of which heating fluid is sufficient to plasticize the elastomer of the loop, that, for the deformation of the loop that has not yet been vulcanized, a fluid is then injected at a positive pressure into the ring-shaped space between the cylindrical wall of the pressure vessel and the force transmission element, as a result of which the force transmission element bears with a pressing force against the outer side of the mold segments of the outer mold and material of the loop is forced into the tooth spaces of the inner mold and of the outer mold, that a heating fluid is then conducted through the inner mold and through the mold segments of the outer mold, the temperature of which heating fluid is sufficient to vulcanize the elastomer of the loop, that, after the vulcanization of the loop, a cooling fluid is introduced through the inner mold and through the mold segments of the outer mold, and that the ring-shaped space between the cylindrical wall of the pressure vessel and the force transmission element is then connected to the ambient pressure or to a negative pressure, and that, finally, the deformed and vulcanized loop, is removed from the manufacturing device and is cut into individual double-sided toothed belts of predetermined width.

To realize a particularly advantageous production method, it may be provided in the case of the method mentioned immediately above that the removal of the deformed and at least pre-vulcanized loop is performed together with the inner mold, such that the further cooling of the deformed loop can take place outside the manufacturing device. Immediately after the removal of the inner mold that bears the vulcanized loop, the manufacturing device can be filled with a second inner mold which bears a not yet deformed and not yet vulcanized loop, which is then directly subsequently plasticized, deformed and vulcanized in the described manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
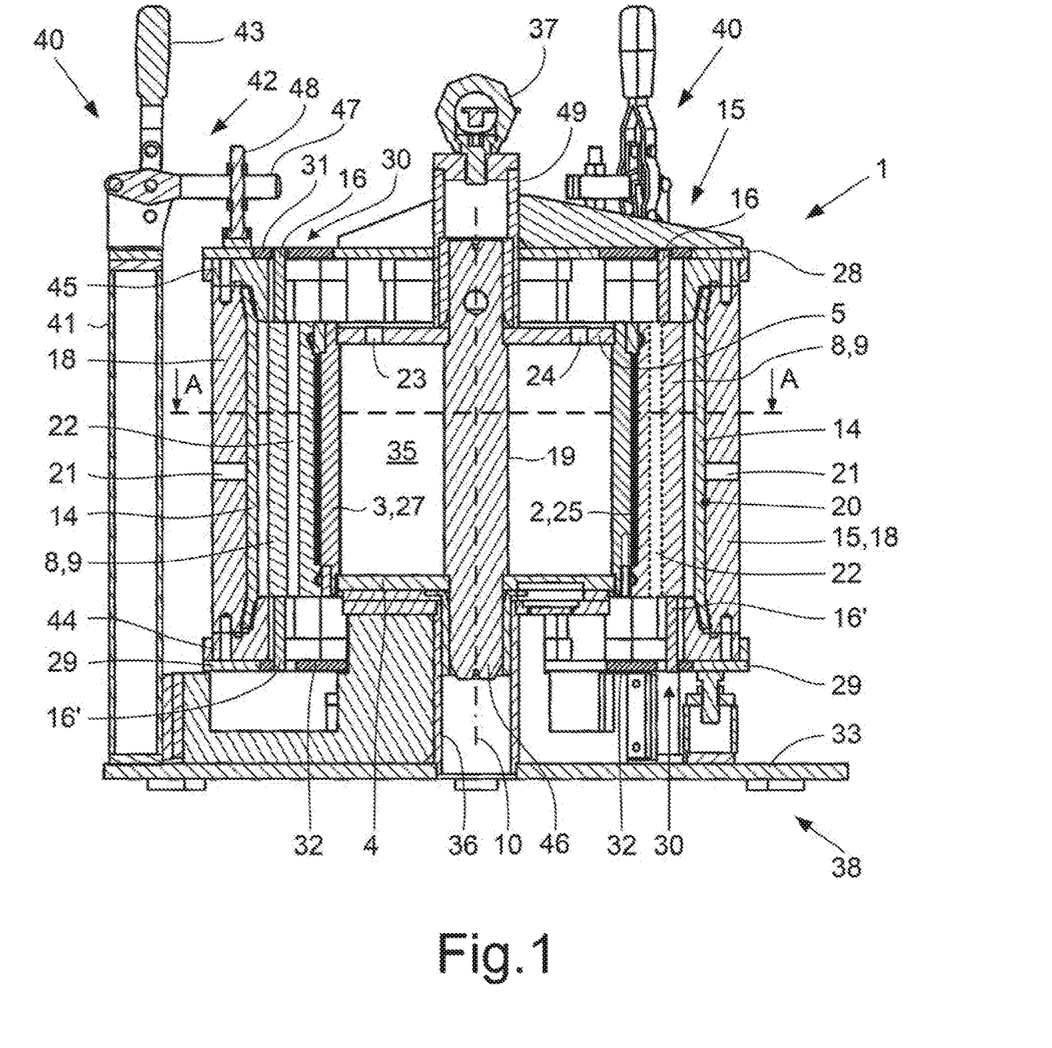
FIG. 1 shows a schematic axial section through a manufacturing device.

The manufacturing device 1 illustrated in FIG. 1 is mounted on a base plate 33 of an overall device 38. The overall device 38 includes the base plate 33, three stanchions 41 of a pressure-exerting device 40, and the manufacturing device 1, via which toothed belts 2 which have teeth on both sides can be produced particularly inexpensively. The functioning of the manufacturing device 1 can be seen particularly clearly in FIGS. 2 to 4.

The manufacturing device 1 has an inner mold 3, the hollow cylindrical wall 27 of which is closed off via a base 4 and a cover 5. The inner mold 3, on its radially outer side, has teeth 6 oriented parallel to the longitudinal axis 10 of the inner mold 3, which teeth are in each case spaced apart from one another by a tooth space 7. The inner mold 3 is surrounded, with a radial spacing, by an outer mold 8 which is composed of a multiplicity of mold segments 9 which are arranged parallel to the longitudinal axis 10 of the inner mold 3 and adjacent to one another in a circumferential direction of the inner mold 3. Each of the mold segments 9, on its side pointing radially inward toward the inner mold 3, has two teeth 11, a tooth space 13 in between, and two half tooth spaces 12 at the edges.

On their flanks which point in the circumferential direction of the manufacturing device 1, the mold segments 9 have a geometry which makes it possible for the mold segments 9, in a radially innermost position, to together form a closed outer mold 8 of the manufacturing device 1. This can be seen in particular in FIG. 4. Even though, in the embodiment illustrated, the outer mold 8 is formed by a total of twenty-five mold segments 9, the outer mold 8 may in the extreme case also be formed by only two mold segments. Here, the number of teeth 11 and tooth spaces 13 per mold segment 9 is then self-evidently much greater. In another extreme example, each mold segment 9 has only one tooth 11 and one half tooth space 12.

The manufacturing device 1 furthermore has a flexible and hollow cylindrical force transmission element 14 which is arranged on the radial outer side of the mold segments 9 and which in the present case is formed as a bellows composed of a temperature-resistant elastomer. The force transmission element 14 is arranged in a ring-shaped space 20 which is formed between the radial outer side of the mold segments 9 and the hollow cylindrical wall 18 of a pressure vessel 15. In each case one guide elements 16, 16'; 16" is fastened axially at the end side to each of the mold segments 9, which guide elements are arranged in radially movable fashion in respectively associated radially oriented guides 17; 31. The guide elements 16, 16'; 16" are preferably composed of a plastic or are composed of metal and are surrounded by a wear-resistant plastics layer, such that they exhibit poor thermal conductivity.

As shown in particular in FIG. 1, the abovementioned hollow cylindrical wall 18 of the pressure vessel 15 is fixedly connected at its axial ends to a lower sup-port ring 44 and to an upper support ring 45. The lower support ring 44 is closed off by a base plate 29, and the upper support ring 45 is closed off via a cover 28. The force transmission element 14, which is formed as a bellows, is fixedly clamped in pressure-tight fashion with its upper axial end between the wall 18 and the upper support ring 45 and with its lower axial end between the wall 18 and the lower support ring 44 of the pressure vessel 15. In this way, between the wall 18 of the pressure vessel 15 and the radial outer side of the force transmission element 14, a part of the abovementioned ring-shaped space 20 is formed in which a fluid at positive pressure can flow in via radial bores 21 in the wall 18 of the pressure vessel 15. As pressurized fluid, use is preferably made of compressed air, which acts on the force transmission element 14 with a pressure of 10 bar to 100 bar, preferably 25 bar to 35 bar. As a result, the flexible force transmission element 14 presses against the radial outer side of the mold segments 9 of the outer mold 8, which are thus moved radially inward. To relieve the mold segments 9 of the outer mold 8 of load, and to facilitate the radial return movement of the mold segments, the ring-shaped space 20 is also connectable via the bores 21 in the wall 18 to the ambient pressure of the manufacturing device or to a negative pressure.

It can furthermore be seen in the figures that each of the mold segments 9 has an axially oriented passage bore 22 through which, in a first operating situation, a heating fluid, such as for example hot water or hot vapor, or in a second operating situation, a cooling fluid, such as for example cold water, can be conducted. In this way, the mold segments 9 can be heated for a plasticization process and a vulcanization process, and can be cooled for the rapid lowering of the temperature of the mold segments 9.

Figure 2:
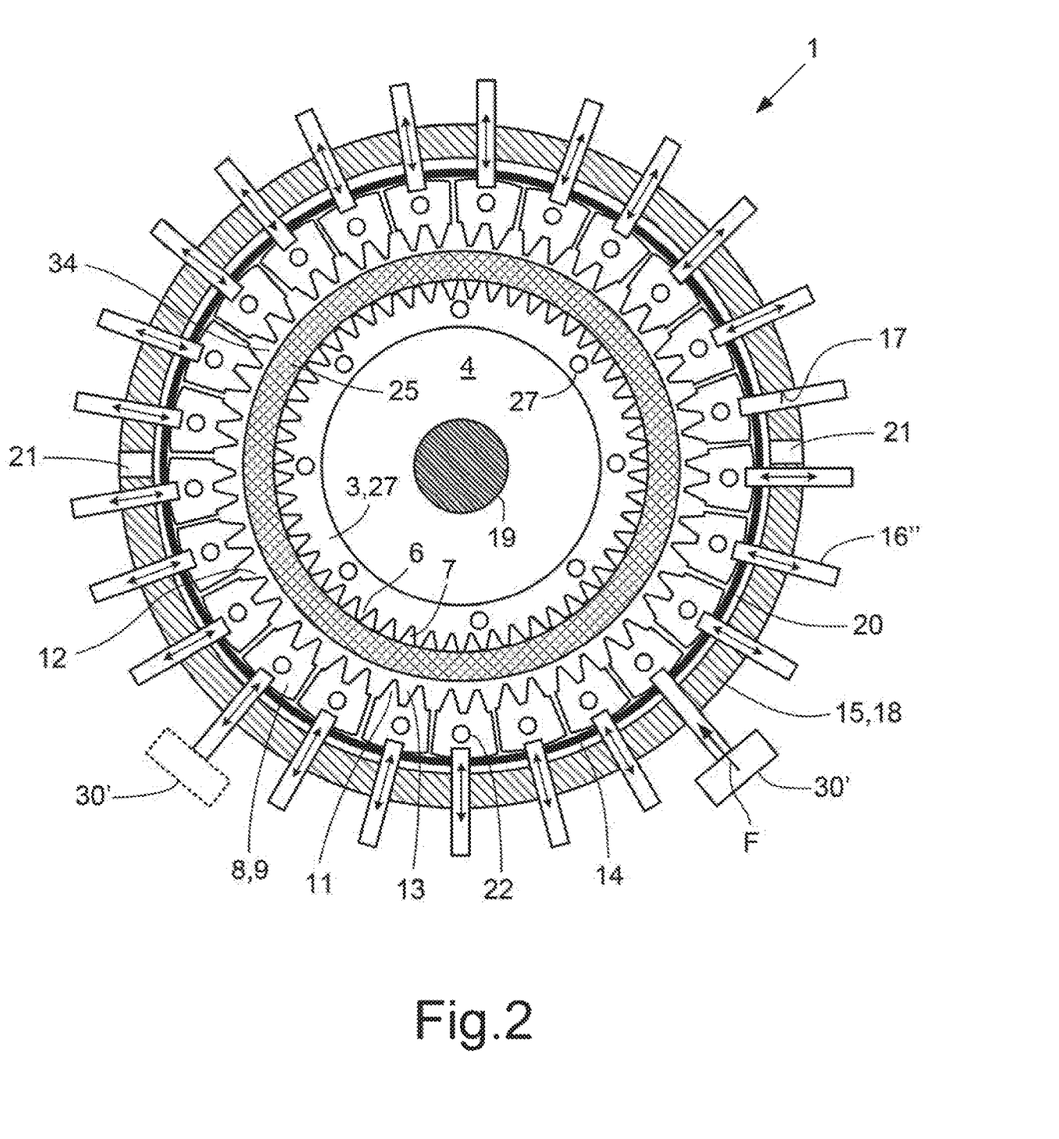
FIG. 2 shows a schematic radial section through the manufacturing device as per FIG. 1 in the region of the line A-A with a radially expanded outer mold.

As illustrated in particular by FIGS. 1 and 2, a deformation space 34 is formed between the radial inner side of the mold segments 9 and the radial outer side of the inner mold 3, in which deformation space there is arranged an elastomer loop 25 that is reinforced with textile layers and filaments. As shown in FIG. 2, the loop 25 is seated in close-fitting fashion on the tooth tips of the teeth 6 of the inner mold 3, whereas the tooth tips of the teeth 11 of the mold segments 9 of the outer mold 8 maintain a radial spacing to the loop before the start of the plasticization and deformation process. The radial spacing facilitates the axial threading of the loop 25 into the deformation space 34 or the insertion of the inner mold 3 together with the loop 25 into the associated receiving region of the pressure vessel 15.

Figure 3:
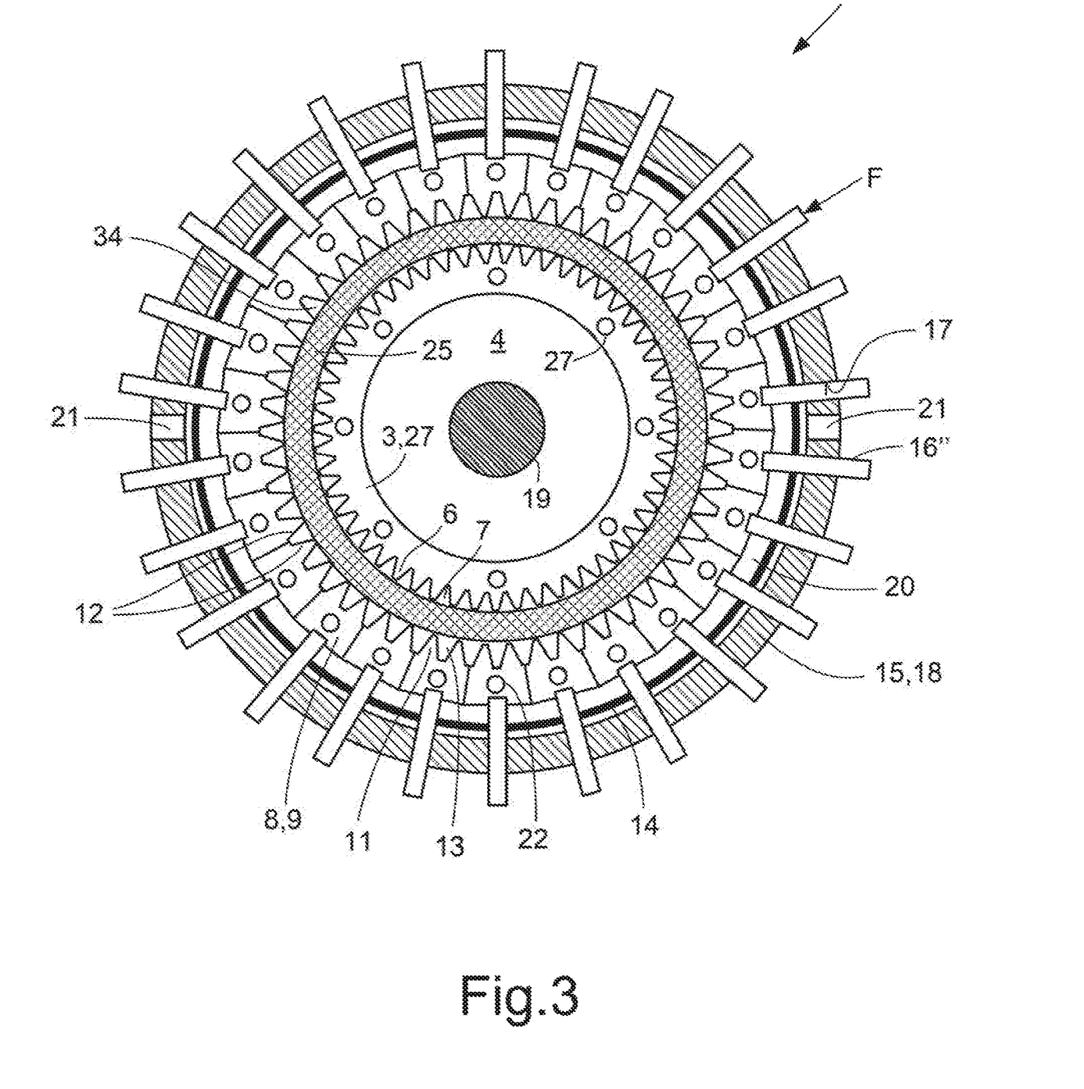
FIG. 3 shows a view of the manufacturing device as per FIG. 2 with an outer mold that has been pushed against a textile-fiber-reinforced loop; and, FIG. 4 shows a view of the manufacturing device as per FIGS. 2 and 3, in which the loop has been deformed and fully vulcanized.

To form a closed outer mold 8, the mold segments 9 are moved radially inward via an actuating device 30, 30' until those flanks of the mold segments 9 which point in the circumferential direction bear loosely against one another with a small amount of circumferential play. Here, the tooth tips of the teeth 11 of the mold segments 9 preferably already bear against the radial outer side of the non-vulcanized loop 25 (FIG. 3).

A heating fluid is subsequently conducted through the passage bores 22 of the mold segments 9 and through the openings 23, 24 in the base 4 or cover 5 of the inner mold 3 into a central cavity 35 of the inner mold 3. Alternatively or in addition to this, the heating fluid may also be conducted through axial bores 27 in the wall of the inner mold 3. The bores 23, 24, 27 may also be utilized for conducting a cooling fluid.

Figure 4:
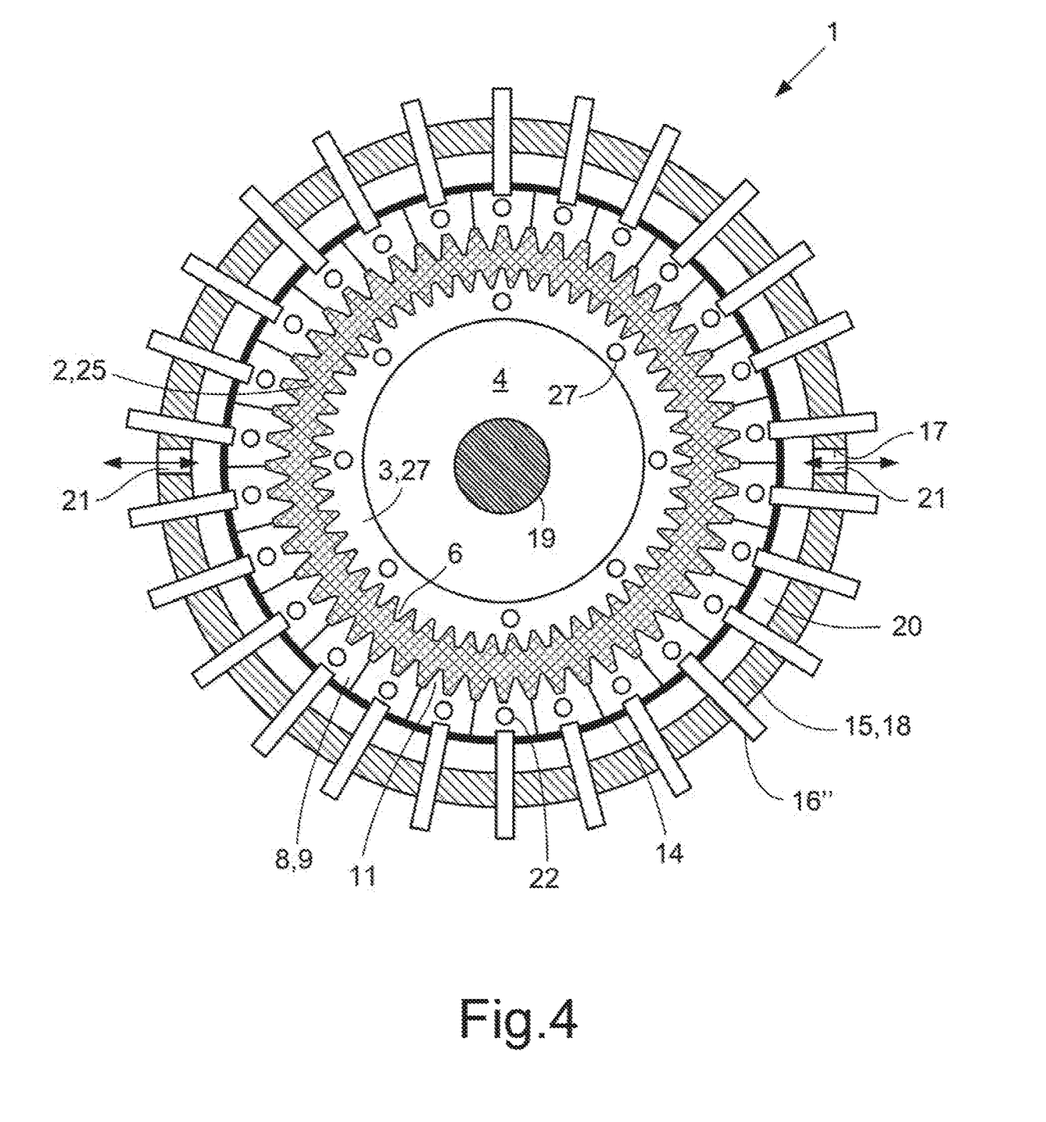

As a result of the heating of the inner mold 3 and of the mold segments 9 of the outer mold 8, the elastomer of the not yet vulcanized loop 25 is brought to its plasticization temperature. Subsequently, a pressurized fluid is introduced at positive pressure through at least one radial opening 21 in the wall 18 of the pressure vessel 15 into the ring-shaped space 20 formed between the wall 18 of the pressure vessel 15 and the force transmission element 14, such that the force transmission element 14 is pressed radially inward against the radial outer side of the mold segments 9. As a result, the mold segments 9 move radially inward against the loop 25 with its now plasticized elastomer, until those flanks of the mold segments 9 which point in a circumferential direction lie flat and in sealing fashion against one another (FIG. 4). As a result of the described radial movement of the mold segments 9 of the outer mold 8, the plasticized elastomer is forced into the tooth spaces 7 of the inner mold 3 and into the tooth spaces 13 of the outer mold 8, such that the geometry of a double-sided toothed belt is already substantially formed.

The temperature of the inner mold 3 and of the mold segments 9 of the outer mold 8 is subsequently increased, using the heating fluid, to a value above the vulcanization temperature of the elastomer, as a result of which the elastomer is vulcanized, and the new geometry of the loop 25 generated in the deformation space 34 is fixed.

In a manufacturing step that then follows, a cooling fluid, preferably water, is conducted through the axial passage bores 22 of the mold segments 9 of the outer mold 8 and through the bores 27 in the wall of the inner mold 3, and/or through bores 23, 24 in the base 3 or cover 4 of the inner mold 3, into the central cavity 35 of the inner mold 3. The inner mold 3 and the mold segments 9 of the outer mold 8 are hereby cooled.

The ring-shaped space 20 between the wall 18 of the pressure vessel 15 and the force transmission element 14 is subsequently connected to the ambient pressure or, better, to a negative pressure, such that the force transmission element 14, which is formed by a bellows, lifts off from the radial outer side of the mold segments 9 of the outer mold 8. The actuating travel of the mold segments 9 amounts to approximately 20 mm to 30 mm depending on the diameter of the inner mold 3.

The mold segments 9 of the outer mold 8 are then moved a short distance radially outward from the loop 25 via the abovementioned actuating device 30, 30', such that the loop 25 is removed from the two molds 3, 8. The manufacturing device 1 is subsequently opened, and the fully vulcanized loop 25 is removed on its own, or together with the inner mold 3, from the manufacturing device.

Following the above description of the basic construction and the mode of operation of a manufacturing device 1 according to the invention, a few particular embodiments will be discussed below with reference to FIG. 1. In the illustrated embodiment, it is provided that the base 4, the central interior space 35 and the cover 5 of the inner mold 3 are extended through by a cylindrical mandrel 19, which at its upper free end is connected to a hollow cylindrical intermediate piece 49. The intermediate piece 49 has an eyelet 37, on which a lifting tool can engage in order to enable the inner mold 3 to be lifted out of the manufacturing device 1. It is furthermore provided that the mandrel 19 engages with its free lower end 46, outside the interior space 35 of the inner mold 3, into a centering receptacle 36 of the manufacturing device 1, which receptacle is formed as a sleeve fastened to the base plate 33 of the overall device 38. Via this construction, it is ensured that, when the inner mold 3, for example together with a non-vulcanized loop 25 arranged thereon, is inserted, these are positioned centrally, such that a predefined small radial spacing to the radial inner side of the mold segments 9 of the outer mold 8 is exactly adhered to.

For the pressing of the cover 28 onto the upper support ring 45 of the pressure vessel 15, in the case of the overall device 38 as per FIG. 1, a pressure-exerting device 40 which can be locked in its closed position is provided, which has three stanchions 41, of which only two stanchions 41 are visible, and in each case one lever mechanism 42 is pivotably fastened to the respective free end of the stanchions. The lever mechanism 42 has in each case a handle 43 via which the pressure-exerting device 40 can be actuated by a technician for the purposes of pressing the cover 28 axially onto the upper support ring 45 of the pressure vessel 15. Here, a lever 47 of the lever mechanism 42 presses against a holder 48 on the cover 28.

To be able to move the mold segments 9 of the outer mold 8 radially in a manner synchronously coupled to one another, the manufacturing device 1 as per the variant shown in FIG. 1 has an actuating device 30, in the case of which in each case one radial guide element 16, 16' is formed on, or is fastened for example as a stud bolt to, the free axial ends of the mold segments 9. The guide elements 16, 16' engage into associated individual spiral-shaped grooves of a first, cover-side positioning disk 31 and of a second, base-side positioning disk 32. The two positioning disks 31, 32 are in each case arranged on the pressure vessel 15 in a rotatably mounted manner in a positive-pressure-free region of the pressure vessel, and serve as guides for the guide elements 16, 16'. Via a rotation of the two positioning disks 31, 32, the guide elements 16, 16' in the spiral-shaped grooves are moved either radially outward or radially inward depending on the direction of rotation. The rotation of the positioning disks 31, 32 takes place owing to the expected relatively high expenditure of force preferably via a pneumatic or electric-motor-powered auxiliary drive.

In the second variant illustrated in FIGS. 2 to 4, the guide elements 16" are arranged not axially but rather radially, and are of bolt-like form. The guide elements 16" are in each case fixedly connected radially at the inside to an associated mold segment 9 of the outer mold 8, and extend through radial guide openings 17 that are formed in the hollow cylindrical wall 18 of the pressure vessel 15. A common actuating device 30' acts so as to exert a radial positioning force F on all of the guide elements 16" simultaneously, such that the guide elements 16" displace the mold segments 9 as far as the radial outer side of the loop 25. The actuating device 30' can also move the guide elements 16" radially outward, such that, in this way, the mold segments 9 can be pulled away from a fully vulcanized or only partially vulcanized loop 25.

Even though, in the embodiment shown in FIGS. 2 to 4, the outlay in terms of apparatus appears to be unfavorably great in particular with regard to the mold segments 9, the guide elements 16", the actuating device 30' and the seals required at the guide openings 17, this proves to be very much less disadvantageous if for example only two mold segments 9 with a total of two guide elements 16" and only two guide openings 17 are provided.

It is understood that the foregoing description is that of the preferred embodiments of the invention and that various changes and modifications may be made thereto without departing from the spirit and scope of the invention as defined in the appended claims.

LIST OF REFERENCE SIGNS

1 Manufacturing device
2 Double-sided toothed belt
3 Inner mold
4 Base of the inner mold
5 Cover of the inner mold
6 Tooth on the inner mold
7 Tooth space on the inner mold
8 Outer mold
9 Mold segment of the outer mold
10 Longitudinal axis of the inner mold
11 Tooth on the mold segment of the outer mold
12 Section of a tooth space on the mold segment of the outer mold
13 Tooth space on the mold segment of the outer mold
14 Force transmission element, bellows
15 Pressure vessel
16 Upper, axial guide element on a mold segment
16' Lower, axial guide element on a mold segment
16" Radial guide element on a mold segment
17 Radial guide openings in the wall of the pressure vessel
18 Hollow cylindrical wall of the pressure vessel
19 Mandrel on the inner mold
20 Ring-shaped space between force transmission element and pressure vessel
21 Pressure medium bore in the wall of the pressure vessel
22 Passage bore in the mold segment
23 Bore in the cover of the inner mold
24 Bore in the cover of the inner mold
25 Loop
26 Hollow cylindrical wall of the inner mold
27 Wall of the inner mold
28 Cover of the pressure vessel
30 Base of the pressure vessel
30, 30' Actuating device for the guide elements 16, 16'; 16"
31 Upper positioning ring, guide for the guide element 16
32 Lower positioning ring, guide for guide element 16'
33 Base plate of the overall device
34 Deformation space between inner mold and outer mold
35 Interior space of the inner mold
36 Centering receptacle for the mandrel 19
37 Eyelet
38 Overall device
39 Lower end of the mandrel
40 Pressure-exerting device
41 Stanchion of the pressure-exerting device
42 Lever mechanism of the pressure-exerting device
43 Handle of the pressure-exerting device
44 Lower support ring of the pressure vessel
45 Upper support ring of the pressure vessel
46 Lower end of the mandrel
47 Lever of the pressure-exerting device
48 Holder on the cover
49 Intermediate piece on the mandrel
F Positioning force

What is claimed is:

1. A manufacturing device for making a double-sided toothed belt, the manufacturing device comprising:
 a hollow cylindrical inner mold defining a longitudinal axis and being closed off via a base and a cover;
 said hollow cylindrical inner mold having a radial outer side and teeth on said radial outer side;

said teeth being oriented parallel to said longitudinal axis of said inner mold;
said teeth each being spaced apart from one another by a tooth space;
an outer mold arranged with a radial spacing to said inner mold;
said outer mold including a multiplicity of mold segments arranged parallel to said longitudinal axis of said inner mold and adjacent to one another in a circumferential direction of said inner mold;
said mold segments each having a side facing said inner mold;
said mold segments each having at least one tooth on said side facing said inner mold;
said mold segments each defining at least one section of a tooth space and/or at least one complete tooth space;
said mold segments defining a radial outer mold segment side;
a flexible and hollow cylindrical force transmission element arranged on said radial outer mold segment side;
a hollow cylindrical pressure vessel having a hollow cylindrical wall which surrounds said force transmission element radially at the outside;
each of said mold segments having two axial ends;
a plurality of guide elements which are fastened or formed in each case on said two axial ends of the respective mold segments and which are arranged in radially movable fashion in respectively associated guides;
said force transmission element being formed as a bellows which is fastened with its two axial ends in pressure-tight fashion to said pressure vessel;
said force transmission element being arranged in a ring-shaped space which is formed between said hollow cylindrical wall of said pressure vessel and said radial outer side of said mold segments;
said pressure vessel having at least one pressure medium bore which opens into said ring-shaped space radially outside said force transmission element;
said mold segments each having one axially oriented passage bore through which both a heating fluid and a cooling fluid are conducted, wherein temperature of the heating fluid is sufficient to plasticize the elastomer of the loop, and wherein the cooling fluid is conducted after complete vulcanization of the loop; and,
said hollow cylindrical inner mold being configured such that both the heating fluid and the cooling fluid are conducted therethrough.

2. The manufacturing device of claim 1, wherein the heating fluid or the cooling fluid can be conducted through said inner mold via at least one bore in said base or said cover of said inner mold.

3. The manufacturing device of claim 1, wherein said inner mold is configured to be removable from said pressure vessel and from said outer mold when said cover of said pressure vessel is open.

4. The manufacturing device of claim 3, further comprising:
a mandrel;
said inner mold defining an interior space; and,
said base, said cover and said interior space of said inner mold being extended through by said mandrel which, axially outside said base, engages with one axial end thereof into a centering recess of said pressure vessel or of an overall device, and which, at its other axial end, has an eyelet for the engagement of a lifting tool.

5. The manufacturing device of claim 1, wherein said mold segments can be moved radially against said inner mold and moved away from the latter via an actuating device.

6. The manufacturing device of claim 5, wherein:
said actuating device is arranged outside said pressure vessel and is connected to the guide elements of said mold segments; and,
said guide elements of said mold segments are made of a material with a low thermal conductivity or are coated with such a material.

7. The manufacturing device of claim 5, wherein:
said mold segments have axial face sides;
said guide elements are arranged or formed on said axial face sides of said mold segments;
said guide elements are configured to interact with at least one positioning ring of the actuating device; and,
said mold segments are configured to be moved radially in the event of a rotation of said positioning ring.

8. The manufacturing device of claim 5, wherein:
said guide elements are each connected radially to one of said mold segments; and,
said guide elements are movable radially by a common actuating device.

9. The manufacturing device of claim 8, wherein:
said guide elements are guided radially and in a sealed manner through said hollow cylindrical wall of said pressure vessel; and,
said common actuating device is arranged radially outside said pressure vessel.

10. A method for making a double-sided toothed belt, which is equipped with teeth on both sides, in a manufacturing device in which a loop made of an elastomer and a textile inlay is arranged radially between a cylindrical inner mold and a cylindrical outer mold in a deformation space, wherein the inner mold, on its radial outer side, has teeth oriented parallel to the longitudinal axis of the inner mold, which teeth are in each case spaced apart from one another by a tooth space, wherein the outer mold includes a multiplicity of mold segments which are arranged parallel to the longitudinal axis of the inner mold and adjacent to one another in a circumferential direction of the inner mold and which, at their side pointing toward the inner mold, have in each case at least one tooth and at least one section of a tooth space and/or at least one complete tooth space, wherein the mold segments are surrounded radially at the outside by a flexible and hollow cylindrical force transmission element which is surrounded by the cylindrical wall of a pressure vessel, and in which method the force transmission element is fastened with its axial ends in the pressure vessel so as to be sealed off radially to the inside, the method comprising the steps of:
conducting a heating fluid through the mold segments of the outer mold and through the inner mold, the temperature of the heating fluid being sufficient to plasticize the elastomer of the loop;
for the deformation of the loop that has not yet been vulcanized, injecting a fluid at a positive pressure into a ring-shaped space between the cylindrical wall of the pressure vessel and the force transmission element, as a result of which the force transmission element bears with a pressing force against the outer side of the mold segments of the outer mold and material of the loop is forced into the tooth spaces of the inner mold and of the outer mold;
conducting a heating fluid through the inner mold and through the mold segments of the outer mold, the temperature of the heating fluid being sufficient to vulcanize the elastomer of the loop;

after complete vulcanization of the loop, introducing a cooling fluid through the inner mold and through the mold segments of the outer mold;

connecting the ring-shaped space between the cylindrical wall of the pressure vessel and the force transmission element to ambient pressure or to a negative pressure;

removing the deformed and vulcanized loop from the manufacturing device; and, cutting the deformed and vulcanized loop into individual double-sided toothed belts of predetermined width.

\* \* \* \* \*